United States Patent [19]
Rosenbaum et al.

[11] Patent Number: 5,031,223
[45] Date of Patent: Jul. 9, 1991

[54] SYSTEM AND METHOD FOR DEFERRED PROCESSING OF OCR SCANNED MAIL

[75] Inventors: Walter S. Rosenbaum, Bethesda; John J. Hilliard, Potomac, both of Md.

[73] Assignee: International Business Machines Corporation, Armonk, N.Y.

[21] Appl. No.: 426,617

[22] Filed: Oct. 24, 1989

[51] Int. Cl.⁵ .............................................. G06K 9/20
[52] U.S. Cl. ...................................... 382/1; 209/584; 209/900; 364/478
[58] Field of Search ................... 209/900, 584; 382/1; 364/478; 235/379

[56] References Cited

U.S. PATENT DOCUMENTS

| 4,632,252 | 12/1986 | Haroki et al. | 209/900 |
| 4,832,204 | 5/1989 | Handy et al. | 364/478 |
| 4,845,761 | 7/1989 | Cate et al. | 382/1 |

FOREIGN PATENT DOCUMENTS 0095737 12/1983 European Pat. Off. ............ 209/900

Primary Examiner—Leo H. Boudreau
Assistant Examiner—David Fox
Attorney, Agent, or Firm—John E. Hoel

[57] ABSTRACT

The invention is characterized as a data processing architecture and method for multi-stage processing of mail, using knowledge based techniques. The system includes OCR-scanning a multipart address field of a mail piece at a sending location, the address field including at least two portions, a first stage routing portion (destination city, state, country, zip code) and a second stage routing portion (destination street address, building floor, corporate addressee internal routing). At the sending location, the image of the entire address field is captured by an OCR head and stored in memory. A serial number is printed on the mail piece. The first routing portion is then converted into sorting signals to sort the mail piece to a truck at the sending location which is to be dispatched to the city, state and country indicated in the first stage routing portion. Then, while the mail piece is in transit by truck to the destination city, the image of the second stage routing portion is analyzed by a knowledge base processor to resolve street addresses, building floor, corporate addressee internal routing information and addressee name. The deferred execution of the analysis by the knowledge base processor is available because of the sporadic volume of mail pieces submitted to the sytem. While the mail piece is in transit on the truck, the knowledge processor completes its analysis and is able to transmit by electronic communications link to the destination location, the information that the mail piece is on its way and the second stage routing information needed to automatically sort and deliver the mail piece to its corporate addressee.

16 Claims, 16 Drawing Sheets

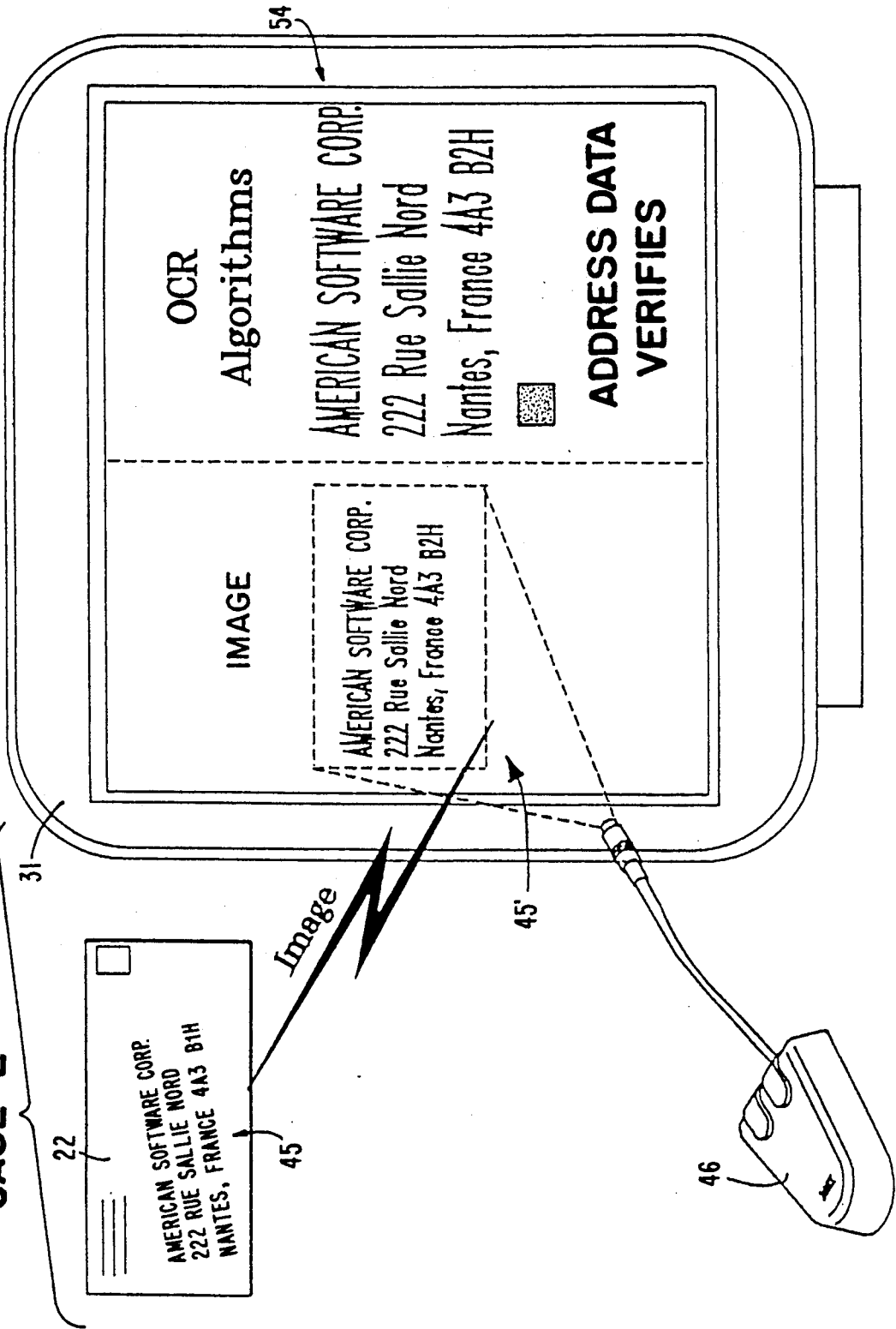

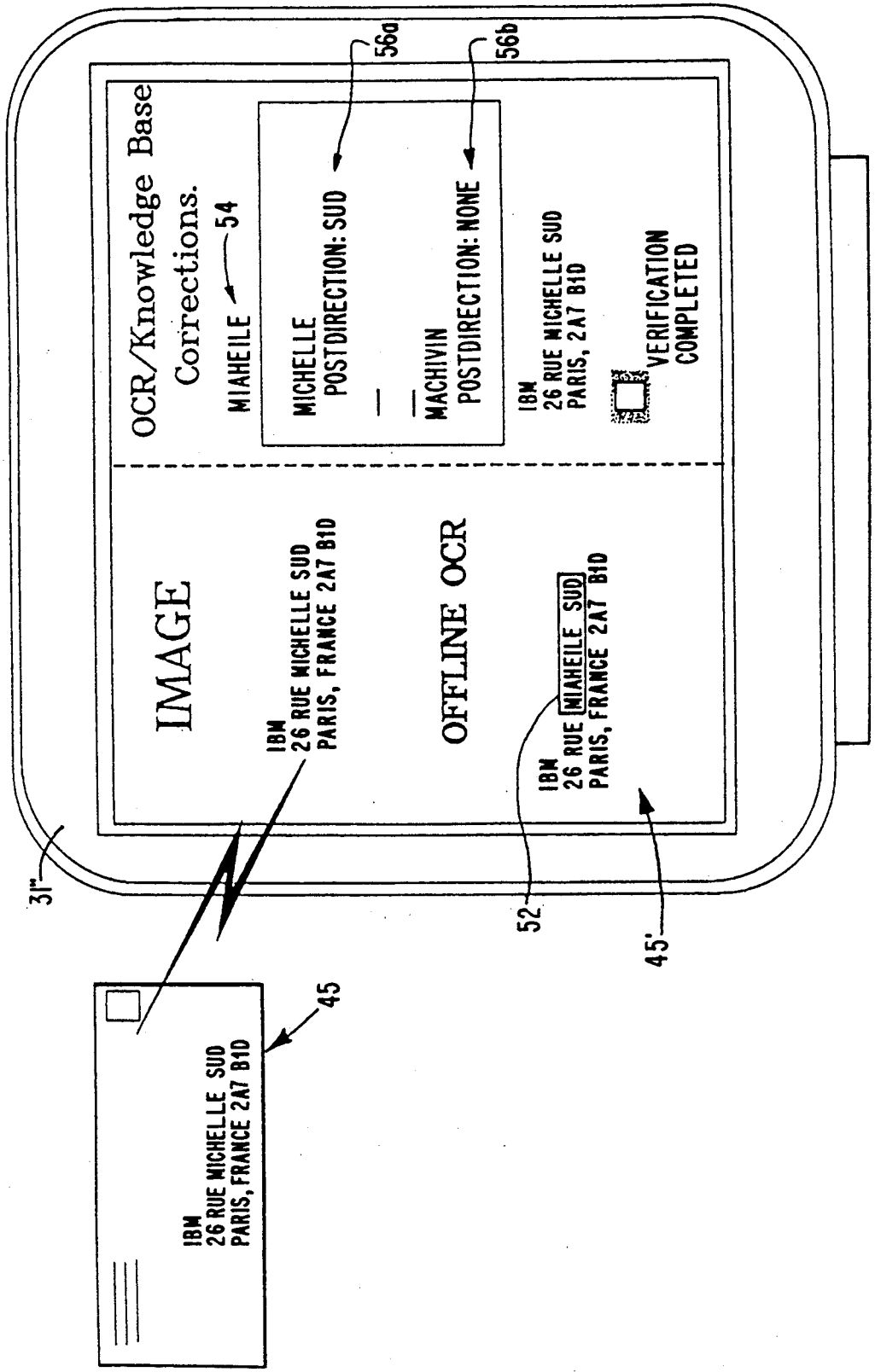

FIG. 11C
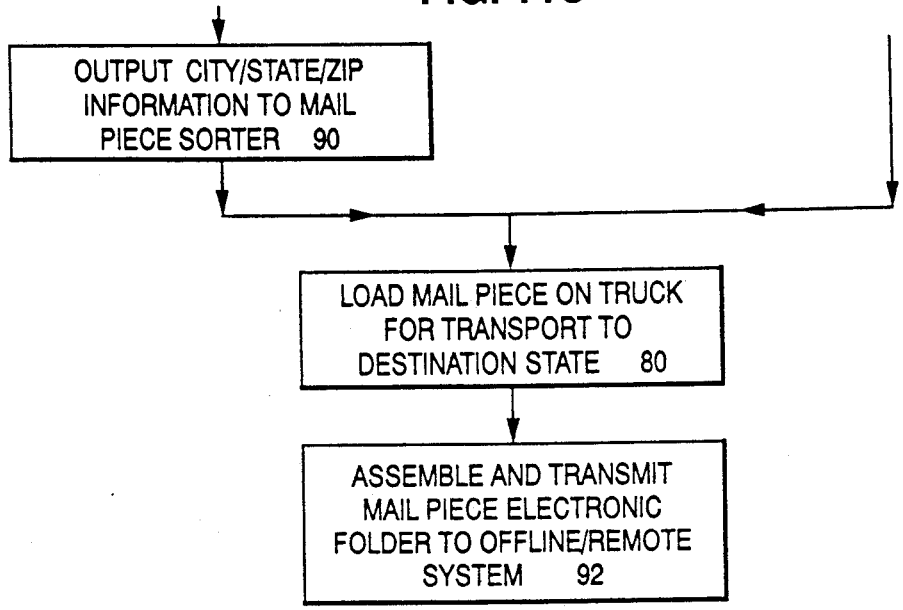
FIG. 12A
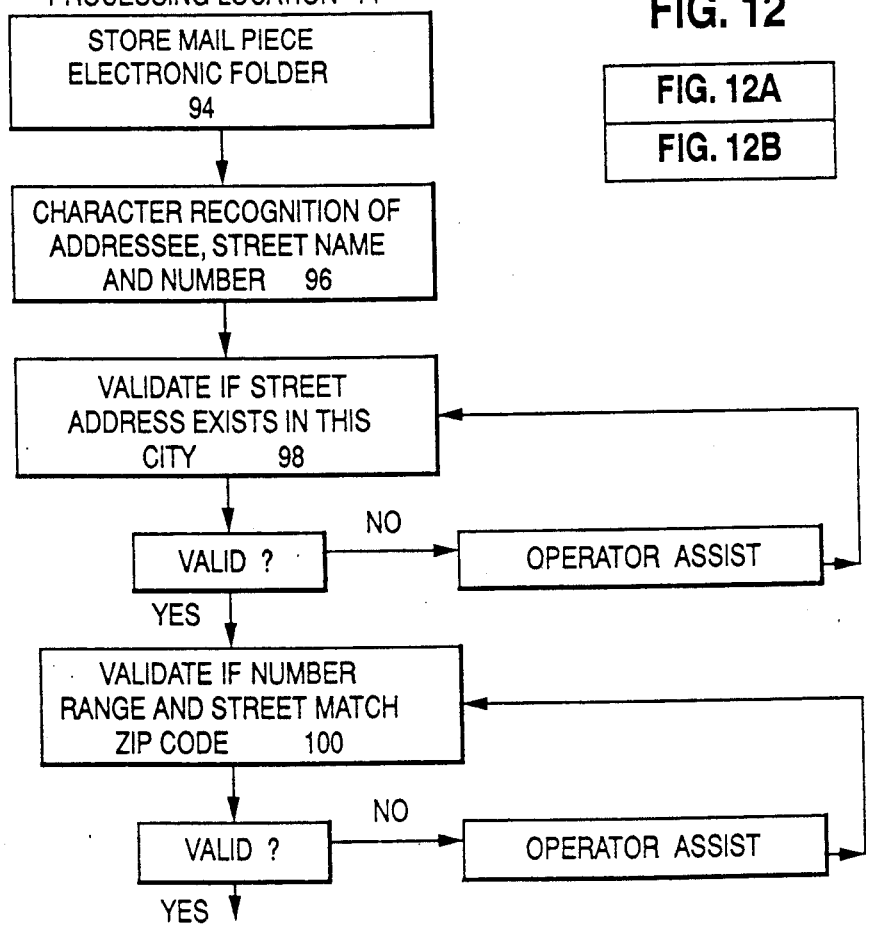
FIG. 12
| FIG. 12A |
| --- |
| FIG. 12B |

FIG. 15

STREET NAME / CITY DATA BASE 98'

| CITY = SPRINGFIELD | CITY = CENTERVILLE |
|---|---|
| STREETS = | STREETS = |
| ABINGTON ST. | APPLETON DR. |
| ARBOR DR. | |
| ⋮ | ⋮ |
| BALTIC DR. | MAIN ST. |
| ⋮ | ⋮ |
| PARK PLACE | WORTHINGTON AVE. |
| ⋮ | |
| ZENIA DR. | |

| ZIP = 99110 | ZIP = 99111 |
|---|---|
| STREET NO. RANGE | STREET NO. RANGE |
| ARBOR DR. 001 - 999 | ABINGTON ST. 500 - 800 |
| | ARBOR DR. 1000 - 9999 |
| PARK PL. 1300 - 9999 | |
| | PARK PL. 001 - 1200 |
| ZENIA DR. 300 - 500 | |

STREET NUMBER / ZIP DATA BASE 100'

SYSTEM AND METHOD FOR DEFERRED PROCESSING OF OCR SCANNED MAIL

BACKGROUND OF THE INVENTION

1. Technical Field

This invention relates to the area of automated mail processing and more particularly to the use of optical character recognition and knowledge base systems methods in mail processing to effect correction of optical recognition errors, aid an operator in disambiguating address misreads, and validating the correctness of the address down to the delivery sequence.

2. Background Art

In the United States in 1988 approximately 160 billion pieces of mail were delivered by the United States Postal Service. The volume of mail is growing at a compound rate of approximately 5% a year. To handle such massive volume of mail, several methods utilizing automated means have been experimented with and installed on a limited operational basis. One means of automated mail processing utilized today revolves around optical character recognition (OCR). The OCR is capable of scanning the address area on an envelope and interpreting it into machine-readable alphabetic and numeric characters. State of the art optical character recognition is restricted to machine printed addresses and is unusable for handwritten or handprinted characters. Additionally, OCR is prone to misread characters and on occasion has difficulty in discerning lines in the address block and, when there is interference on the face of the envelope, is unable to find the address box. When a misread occurs, the mail piece cannot be properly sorted and either is rejected or an attempt is made to enter the correct address read by utilizing the directory of the street or city names. Since most mail reading OCRs process mail pieces at the rate of 600 to 800 per minute, the amount of time in which misread correction can be performed limits the correction to only the most superficial errors and does not allow for validation of the OCR read of the address using all constituent information in the address box. For example, no attempt is made to determine that a given street actually exists within a certain zip code and that the city/state match the zip code and above all that the addressee actually exists at this location. The inability to do complete validation and verification on the OCR scan has limited the utility of OCRs to mainly reading the outgoing city/state/country/destination which is normally found on the bottom most line of the address box. The other lines of the address, which can number an additional five lines and the information to sort a letter down to delivery sequence within a building, cannot at this time be scanned, OCRed, validated and used for sortation down to delivery sequences.

Without the ability to validate the correctness of the OCR interpretation of all lines in the address block, the reliability of sortation down to delivery sequence drops dramatically. This leads to the situation where a major part displaceable cost in the mail sortation process results in the handling of mail after it arrives at its destination post office, whereas the reliability of OCR at that point drops dramatically to approximately 25% reliability.

An alternative to the use of OCRs is the preprinting of envelopes with a bar code of phosphorescent ink encoding that allows machines to simply and accurately read address information off the envelope without having to do optical character recognition. The methods related to pre-printing envelopes however, fall short since they are only a relatively small fraction of the mail volume and hence from a logistics standpoint only provide useful sortation to the destination post office and cannot substantiate a large enough volume of mail to make it worthwhile to process the mail automatically down to the delivery sequence.

The invention disclosed herein addresses the problem of performing with reliability, mechanical separation of mail down to the "delivery sequence" utilizing optical character recognition and image scanning techniques coupled with knowledge based operator-assisted disambiguation and validation of the address data down to the delivery sequence. The invention also includes a method to do this off-line to re-associate the sortation information with the mail piece and optimize mail processing by utilizing apriori knowledge of the mail distribution.

OBJECTS OF THE INVENTION

It is therefore an object of the invention to provide an improved technique for processing OCR scanned mail.

It is another object of the invention to provide an improved technique for the multi-stage processing of mail.

It is still a further object of the invention to provide an improved technique for analyzing the aggregate volume of mail flowing through the postal system, for the allocation of equipment and personnel at apparent destination locations.

SUMMARY OF THE INVENTION

These and other objects, features and advantages of the invention are accomplished by the system for deferred processing of OCR scanned mail, disclosed herein. The invention is characterized as a data processing architecture and method for multi-stage processing of mail, using knowledge based techniques. The system includes OCR-scanning a multipart address field of a mail piece at a sending location, the address field including at least two portions, a first stage routing portion (destination city, state, country, zip code) and a second stage routing portion (destination street address, building floor, corporate addressee internal routing).

At the sending location, the image of the entire address field is captured by an OCR head and stored in memory. A serial number is printed on the mail piece. The first routing portion is then converted into sorting signals to sort the mail piece to a truck at the sending location which is to be dispatched to the city, state and country indicated in the first stage routing portion.

Then, while the mail piece is in transit by truck to the destination city, the image of the second stage routing portion is analyzed by a knowledge base processor to resolve street addresses, building floor, corporate addressee internal routing information and addressee name. The deferred execution of the analysis by the knowledge base processor is available because of the sporadic volume of mail pieces submitted to the system.

While the mail piece is in transit on the truck, the knowledge processor completes its analysis and is able to transmit by electronic communications link to the destination location, the information that the mail piece is on its way and the second stage routing information needed to automatically sort and deliver the mail piece to its corporate addressee.

In addition, the knowledge base processor analyzes the aggregate volume of mail flowing through the postal system and transmits to each destination location, inventory and resource allocation information necessary to plan for the equipment and manpower needed in the following days to sort and deliver the mail at each destination location.

BRIEF DESCRIPTION OF THE DRAWINGS

These and other objects, features and advantages of the invention will be more fully appreciated with reference to the accompanying figures.

FIG. 9 illustrates an operator display where a misoriented address block is located and designated by the operator and then an OCR reading of the manually located address block is performed.

FIG. 10 illustrates the operator display for case 3 where there has been an OCR misread.

FIG. 15 illustrates an example of the street name/city data base and the street number/zip data base in the memory 19'' of the off-line or remote processing system 14.

DESCRIPTION OF THE BEST MODE FOR CARRYING OUT THE INVENTION

Figure 1:
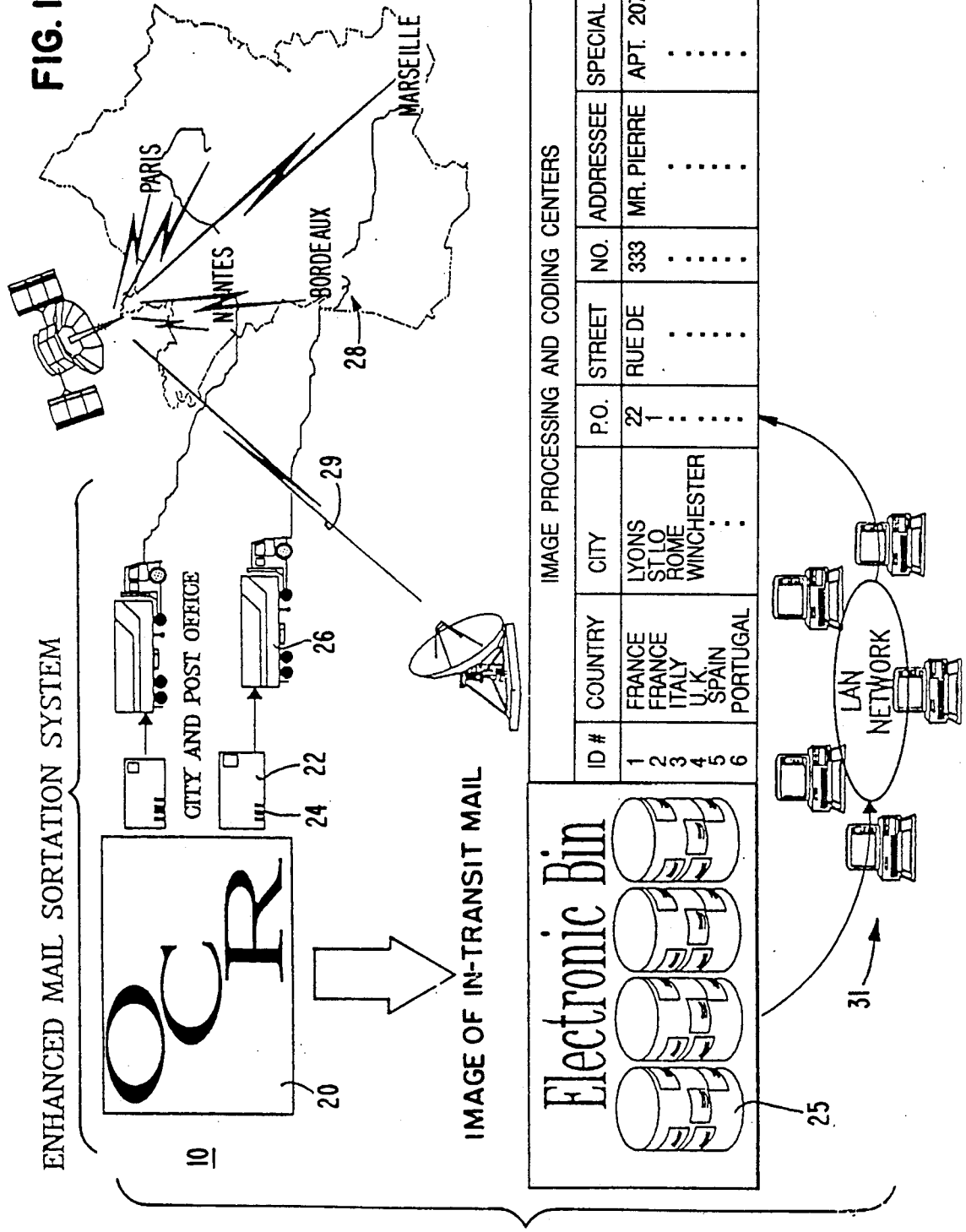
FIG. 1 is a system diagram of the invention.

The invention is directed to automated mail handling and focuses on providing a highly reliable, generally implemented methodology that supports mechanical separation of mail down to the "delivery sequence." This implies that when the automated phases of mail piece processing are completed, the letters are in their carrier delivery sequence down to suite/apartment within a building. To accomplish this, reliable, consistent analysis of up to five lines of address information is required. Current state of the art using optical character recognition (OCR) analyzes only one line. Nearly one quarter of postal labor is currently involved in manual sortation of mail down delivery sequence. The invention applies the principles of "Just In Time Manufacturing" (JITM) to automate mail processing. The general steps of the process are as follows:

1. Mail pieces are scanned by a state of the art optical character recognition (OCR) which resolves the city/state/zip line of the address. This is sufficient to route the letter to a district delivery post office. Each mail piece is then "bar coded" with an ID number and dispatched to its delivery post office.

2. The image scan of the address block (which contains the remaining 3-4 lines of address information) is captured, compressed to about one kilobyte (KB) and stored on a disk.

3. While the physical mail pieces are in route to their delivery post offices, (i.e., via truck, train, or plane, or on a dolly within the same post office) their respective address block images are processed off-line in specially configured workstations located either at the sending location or at a remote location.

4. In the workstation, each address block image is processed to resolve sortation down to delivery sequence as follows:
   a. Off-line OCR is performed on the remaining 3-4 address lines of the address block in either a workstation or in a LAN server processor.
   b. The address data is reviewed against a Post Knowledge Base. If there are no apparent OCR misreads, then the system will:
      Validate and cross check all the address fields including the recipient.
      Resolve any address ambiguities such as incomplete address.
      Derive the delivery sequence within a building.
   c. If OCR misreads are encountered, then the system will:
      Perform OCR misread correction using algorithms for spelling correction. The correction candidate information is displayed to the workstation operator along with the original image. The operator makes the final correction decision. This provides advantages over the operator re-keying the address correction, including economy of keystrokes and avoidance of operator errors.
      Knowledge based disambiguation of incomplete address data.

5. At the completion of Step 4, all the address data required to machine sort the mail piece down to delivery sequence will have been resolved. The information is then batched by destination post office and transmitted via a high speed telecommunications network to the respective destination post offices.

6. The address information is re-associated with each physical mail piece when it arrives at the destination post office via the ID number previously bar coded on the envelope. The physical mail piece and its sortation information hence "come together" in Just In Time Manufacturing fashion and the sorting is completed down to delivery sequence.

Operational refinements that can be overlaid on the basic invention are:

1. The order in which mail pieces are processed at the workstation can be prioritized based on destination post office distance (travel time). Those mail pieces with the longest overland travel time can be assigned the lowest priority, since there is more time to process their address image. Those mail pieces which will be "turned around" in the same post office will be given the highest priority.

2. Handwritten envelopes can be detected as non-machine readable and directed to special operators rated for re-keying skills (i.e. since no OCR is possible on handwriting). The re-keying is automatically terminated as soon as enough information has been entered to complete the sortation to delivery sequence. Termination decisions can be made on a word-by-word basis.

3. Mail pieces that were rejected by the OCR because the address block could not be found, are bar coded with an ID and their image displayed at an operator's workstation. Using a mouse, the operator can confirm the location of the address box. A video sensing algorithm allows the perimeter of the address box to be automatically calculated once the cursor has been placed on any part of the address box. Operator assisted OCR processing and knowledge base disambiguation can be used to start the mail piece on its way and complete the JITM sorting at the delivery post office per Steps 5 and 6 above.

The apparent operational benefits to the postal system are:

1. Better use of equipment, people and optimization of sort allocation by knowing the "exact" distribution of incoming mail before the start of processing.
2. Improved theft security by reducing the number of human handling steps.
3. Lower peak mail processing requirements by extending the processing window by the length of the transit times.
4. Ability to become a major player in "moving work to people" since the workstations do not need to be co-located with the sorting.
5. The proposed automation process uses general purpose hardware for workstations and utilizes the postal system's current investment in on-line OCRs.
6. The technology provides an efficient, automated process for both printed and handwritten mail pieces. This is a prerequisite for a global solution and to achieving economies of scale that justify the automation.

Figure 2:
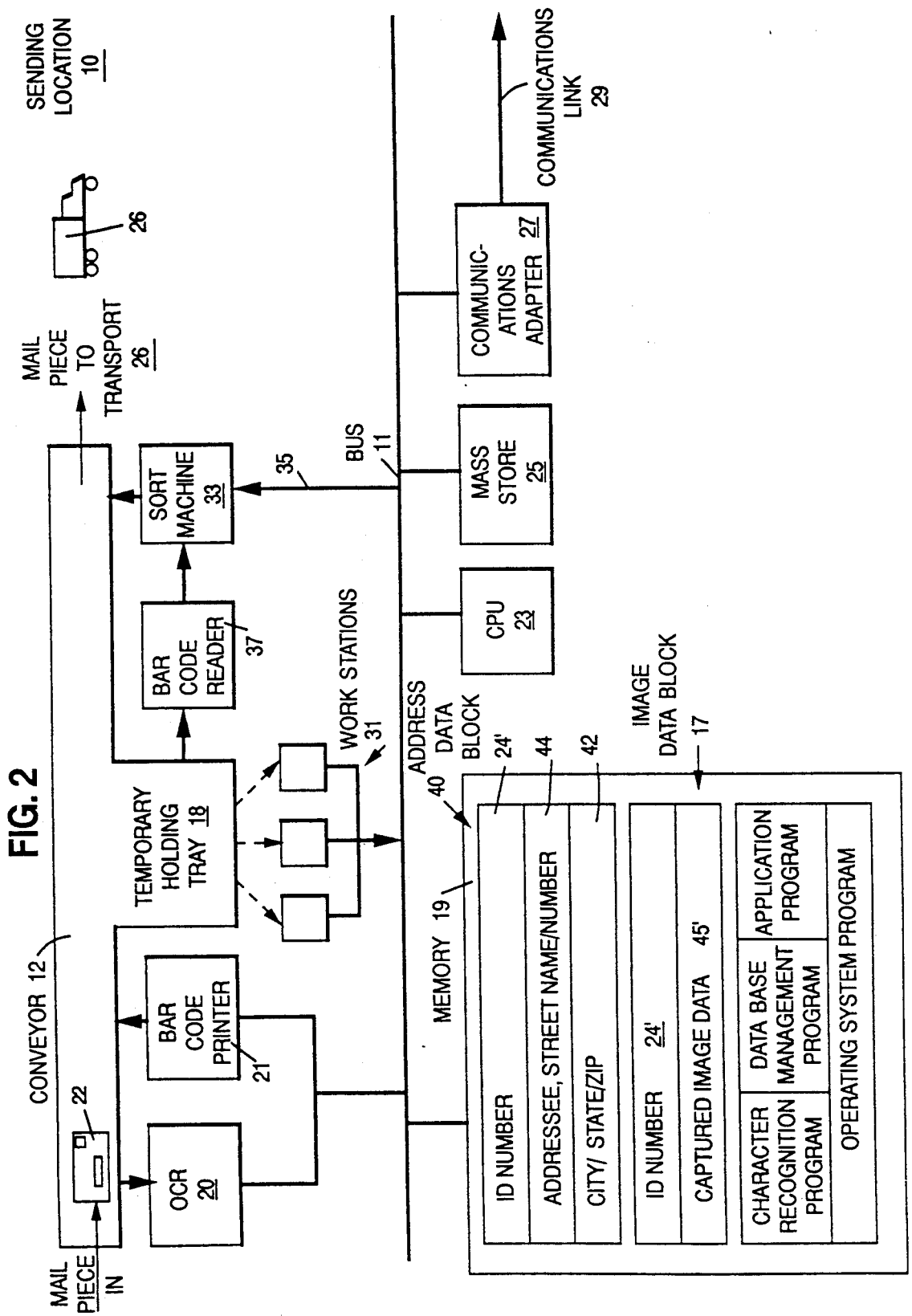
FIG. 2 is a functional block diagram of the architecture at the sending location, in accordance with the invention.
Figure 3:
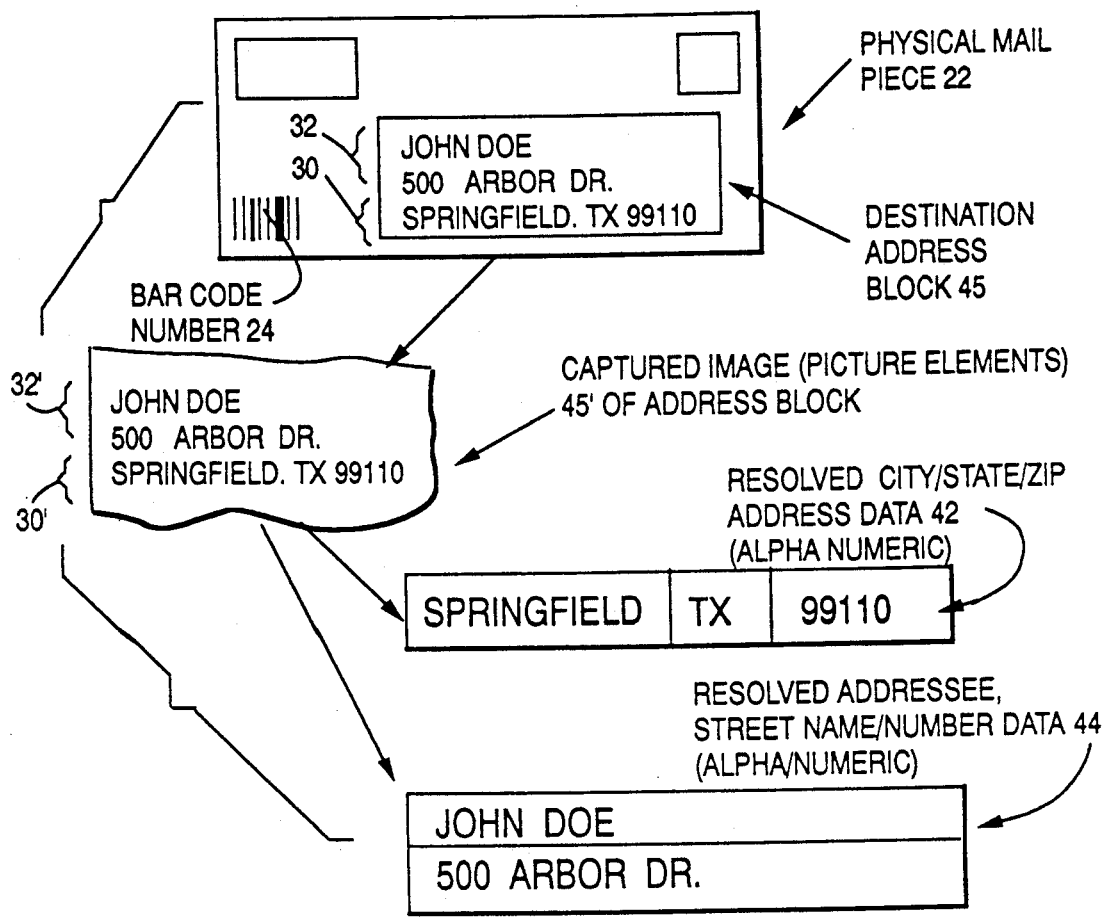
FIG. 3 illustrates the relationship between the address block on the physical mail piece and the captured image of the address block and the resolved alphanumeric address data.

Turning now to the figures, FIG. 1 is an overall system diagram of the invention and FIG. 2 is an architectural diagram of the sending location 10. Mail pieces which originate at the sending location 10 are read through the optical character recognition machine (OCR) 20. FIG. 3 illustrates a physical mail piece 22 which has a destination address block 45 which includes the city/state/zip address data 30 and the addressee, street name and street number data 32. The OCR 20 scans the physical mail piece 22 and captures the image 45' of the address block as a two-dimensional array of picture elements in a bit plane. The captured image 45' includes the image 30' of the city/state/zip information 30 and it further contains the image 32' of the addressee and street name and street number 32. The OCR 20 attempts to resolve the image 30' of the city/state/zip information 30 into an alphanumeric character string of resolved address data 42. In accordance with the invention, the system defers the resolution of the image 32' of the addressee, street name and street number information 32 until later.

Figure 6:
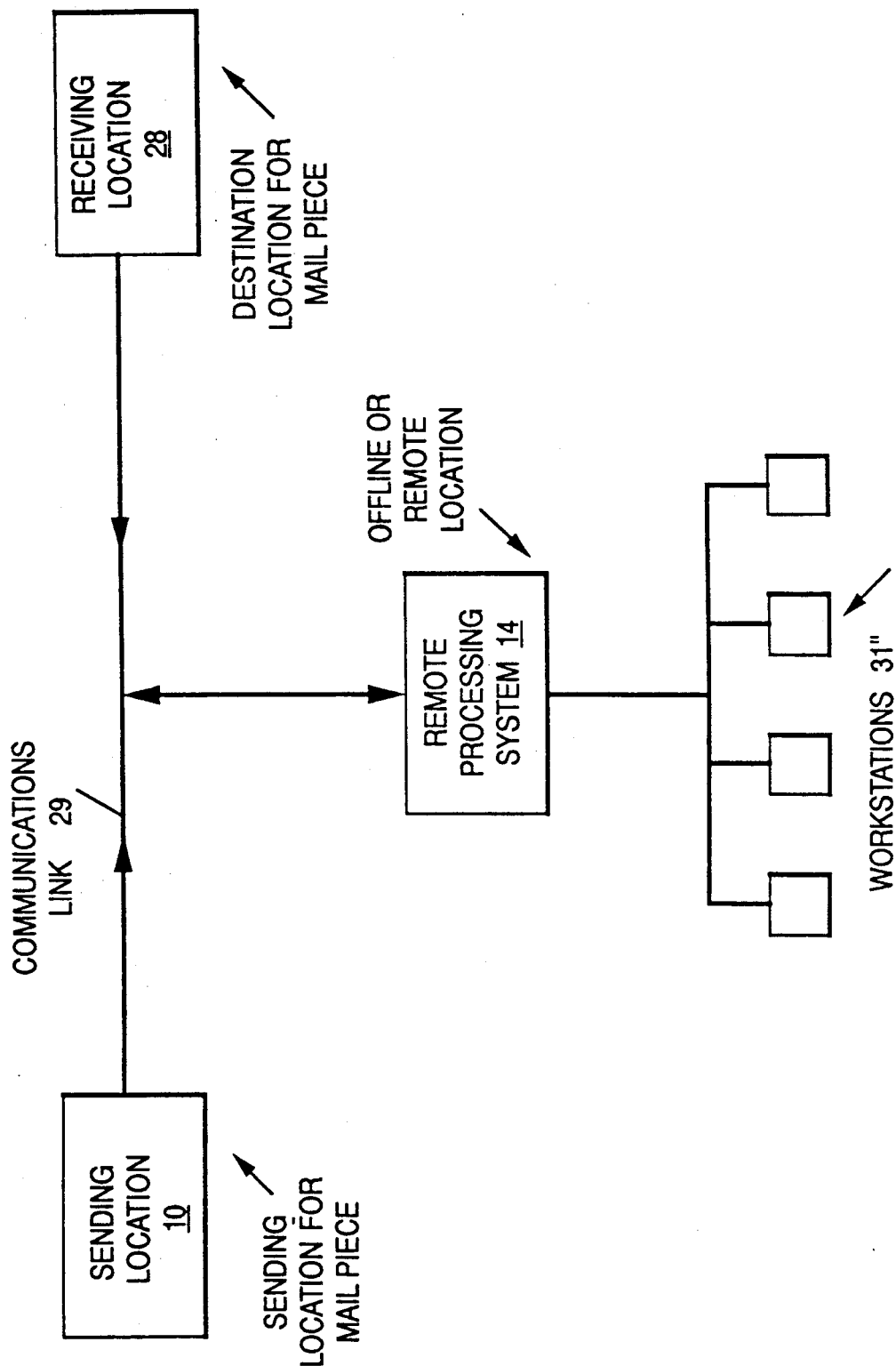
FIG. 6 is a system block diagram illustrating the relationship between the sending location, the receiving location, and the off-line or remote processing system.

As is seen in FIG. 2, a locally originated mail piece is input to the conveyor 12 and passes beneath the OCR 20 where it is scanned. The mail piece then continues on the conveyor belt and the bar code printer 21 prints a serial number 24 onto the mail piece 22. In its normal operation, the OCR 20 will read the second portion 30 of the address block 45 consisting of the city, state, country and zip code destination, and will enter this into the resolved address data block 40 in the memory 19 of FIG. 2. The data processing system of FIG. 2 includes the CPU 23 which is connected by means of the bus 11 to the memory 19, the OCR 20 and the bar code printer 21. The system of FIG. 2 further includes the workstations 31, the bar code reader 37, the sorting machine 33 connected by the connection 35, the mass store 25 and the communications adapter 27 all interconnected by the system bus 11. The communications adapter 27 communicates over the communications link 29 to the receiving location 28 and the off-line or remote processing system 14, as is shown in FIG. 6.

The resolved address data block 40 shown in FIG. 2 has two portions, the first portion 42 stores the resolved alphanumeric string for the city, state, zip code or country as was recognized by the OCR 20 in its scanning operation. The second portion 44 of the resolved address data block will contain the resolved addressee and street name and street number information which will eventually be output during the course of the operation of the invention.

The resolved city, state, zip code and/or country information in portion 42 of the resolved address data block 40 is output to the sorting machine 33 and is used to physically sort the mail piece 22 into an appropriate pocket in the sorting machine. The physical pocket in the sorting machine 33 is associated with a particular mode of transportation, whether by airplane, truck, train or other mail transportation medium, which is destined to the city and state and country named in the destination address block 45.

As the mail piece 22 passes out of the OCR 20, the bar code printer 21 prints a bar code 24 representing an identification number 24' (which will allow the mail piece 22 to be re-associated with the information in the resolved address data block 40.) That re-association, in one embodiment of the invention, is made at the receiving location 28 for the mail piece, where the resolved addressee, street name and street number information 44 can be associated with a particular mail piece 22 by the identity of the identification number 24'. In an alternate embodiment of the invention, where the sorting machine 33 is not electronically connected by the link 35 to the OCR 20 and the CPU 23, the bar code 24 can also be used by the bar code reader 37 to enable the accessing of the appropriate city/state/zip information to control the sorting machine 33.

When the mail piece 22 is scanned by the OCR 20, the captured image 45' is stored as a two-dimensional bit plane of picture elements in the mass storage 25, which can be for example a large capacity magnetic DASD. The image 45' is stored in conjunction with its identification number 24' as the image data block 17 in FIG. 2, and is accessible by its identification number. That same identification number 24' is also another portion of the resolved address data block 40, to facilitate accessing thereof. Still further, that identification number 24' is imprinted by the bar code printer 21 as the bar code 24 onto the face of the mail piece 22.

If the image 30' of the captured image 45' of the address block is successfully resolved, then the city, state, zip and country information can be output by the OCR 20 in conjunction with the CPU 23 to the sort machine 33 to physically sort the mail piece.

If instead, the image 30' of the captured image 45' containing the city, state, zip and/or country information is not successfully recognized, then the CPU 23 directs the conveyor 12 to send the mail piece 22 to the reject tray 18, the mail piece 22 still having the bar code 24 imprinted thereon with the identification number. Thereafter, by further data processing analysis and/or by additional operator intervention and interpretation, the unresolved portions of the city/state/zip/country codes in the image 30' can be determined and input to the portion 42 of the resolved data block 40. Thereafter, the reject mail in the temporary holding tray 18 can be fed into the bar code reader 37 associated with a sorting machine 33, for the identification number for each mail piece is read. That number is then associated by the CPU 23 with the corresponding resolved address data block 40 and the information in the portion 42 can be accessed to control the sort machine 33. The sort machine 33 can then properly sort the mail piece 22 into the appropriate transport 26.

After the first sorting operation at the sending location 10, the mail piece 22 is physically loaded onto a carrier 26 such as a truck, airplane or other appropriate transportation medium, and is physically transported to the postal destination 28.

Where the portion 42 of the address data block 40 gives the resolved city and state information indicating that the mail piece is addressed to a recipient located at the same sending location, then use is made of the resolved addressee and street number information in portion 44 of the address data block 40. If the portion 42 of the resolved address data block 40 indicates that the city, state, zip code is that of the sending location, then the mail piece is characterized as turnaround mail and will typically be processed with a higher priority than remote destination mail. The local mail is preferentially processed by performing the resolution of the addressee and street name and street number information image 32' of a captured image 45', the reduction of this information being performed prior to those operations for remotely destined mail pieces. In a similar manner, prioritization based upon the estimated travel time for remotely destined mail pieces can be performed, giving a lower priority to those mail pieces whose physical transport duration is longer.

Each captured image 45' of the address block stored on the mass storage device 25 is processed off-line to resolve the addressee and the street name and street number information image 32'. This information, once resolved, will then be entered as alphanumeric data into the portion 44 of the resolved address data block 40. This operation is carried out by the CPU 23 using character recognition algorithms and knowledge base verification information, in accordance with the invention. Since this processing can be deferred from the initial OCR scan of the mail piece, this process of interpretation of the addressee information image 32' can be performed in a remote processing facility such as the remote processing system 14 shown in FIG. 6. Workstations 31" at the system 14 can be used for any needed operator intervention in the interpretation of the images 32'.

Figure 4:
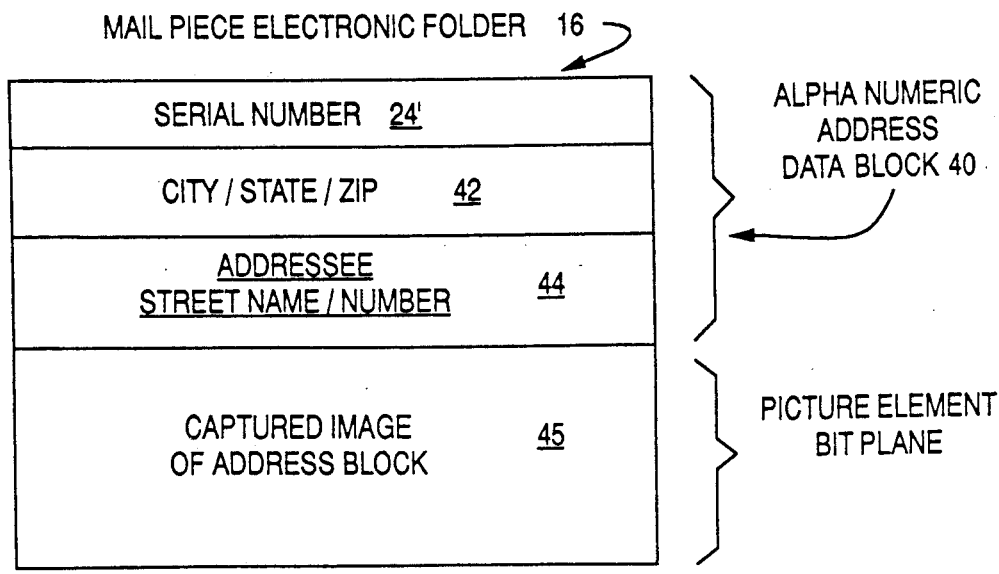
FIG. 4 illustrates a generalized format for the mail piece electronic folder.

Once the addressee and street name and street number information is converted into an alphanumeric string in portion 44 of the address data block 40, the resolved address data block 40 can be transmitted through the communications link adaptor 27 and over the communications link 29 to the destination location 28. This is achieved by assembling the mail piece electronic folder 16 as shown in FIG. 4 which is a message data block which includes the serial number 24', the city/state/zip alphanumeric information 42', the addressee, street name and street number alphanumeric information 44, and optionally, the captured image 45' of the address block, in the form of the bit plane of picture elements. In those instances where the addressee, street name and street number image 32' have not yet been resolved, then the portion 44 of the mail piece electronic folder 16 will be empty and it will be necessary to to include the captured image 45' in the mail piece electronic folder 16, when it is transmitted to either the off-line or remote processing system 14 or alternately to the receiving location 28, where the addressee, street name and street number image 32' can be resolved.

Figure 5:
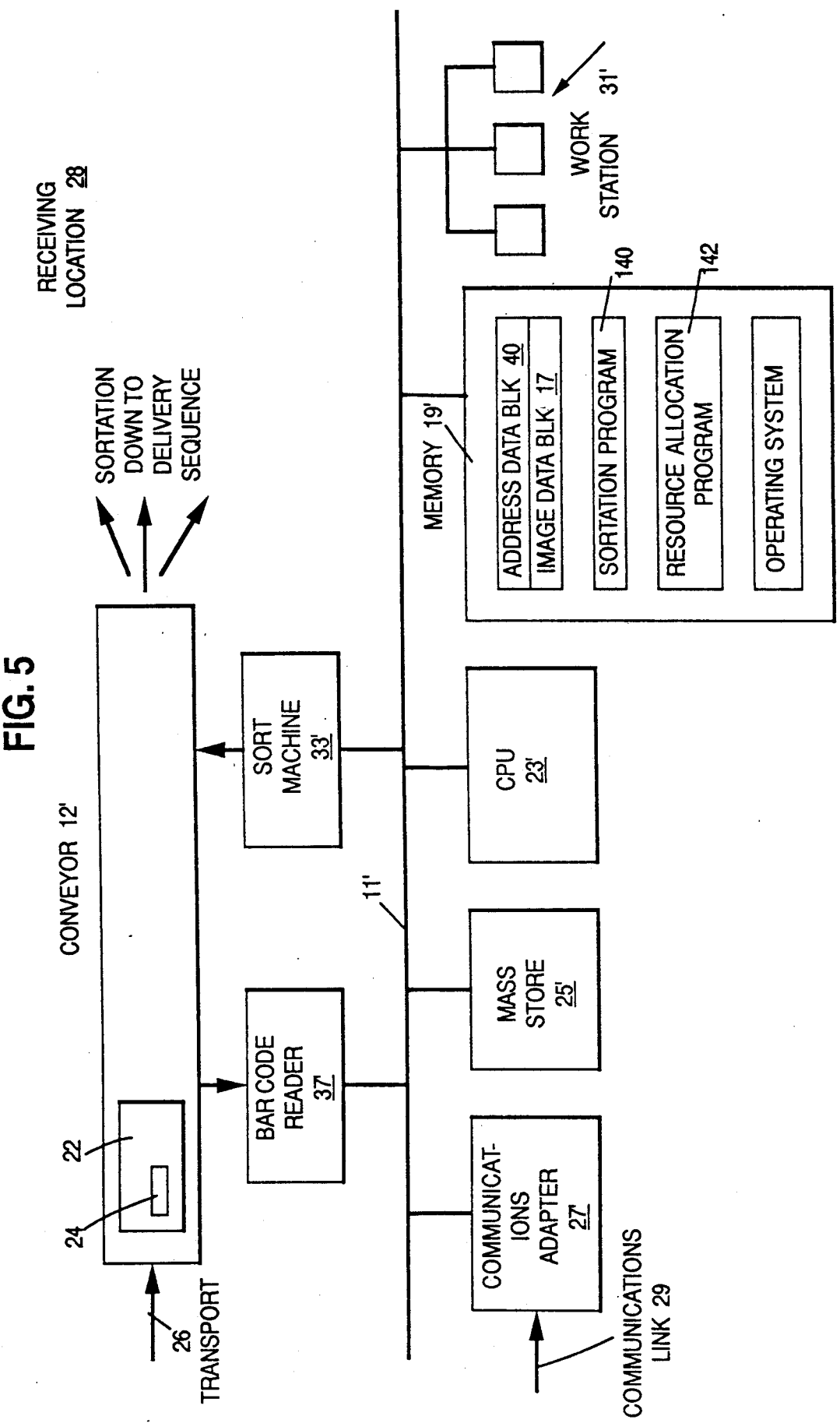
FIG. 5 is an architectural block diagram of the receiving location, in accordance with the invention.

At the destination location 28, the resolved address data block 40 will have its information used for providing the addressee and street name and street number information to enable routing the mail piece at the destination location 28. FIG. 5 shows an architectural diagram of the receiving location 28, where the transport 26 delivers the mail piece 22 onto the conveyor 12'. The mail piece 22 has its bar code 24 read by the bar code reader 37' and that serial number is then associated by the CPU 23' with the address data block 40 which has been received over the communications link 29 by the communications adaptor 27'. The addressee, street name and street number information 44 in the received address data block 40, is then applied by the CPU 23' to the sort machine 33' to perform the sortation of the mail piece 22 down to the delivery sequence. The sorted mail piece 22 can then be locally delivered at the receiving location 28 to the addressee at his particular street and street number. The portion 44 of the address data block 40 can also include an addressee building floor number. The CPU 23' can control the sorting of the mail to appropriate local mail routes, in a street name order and address number order and a building floor order, if appropriate.

Figure 7:
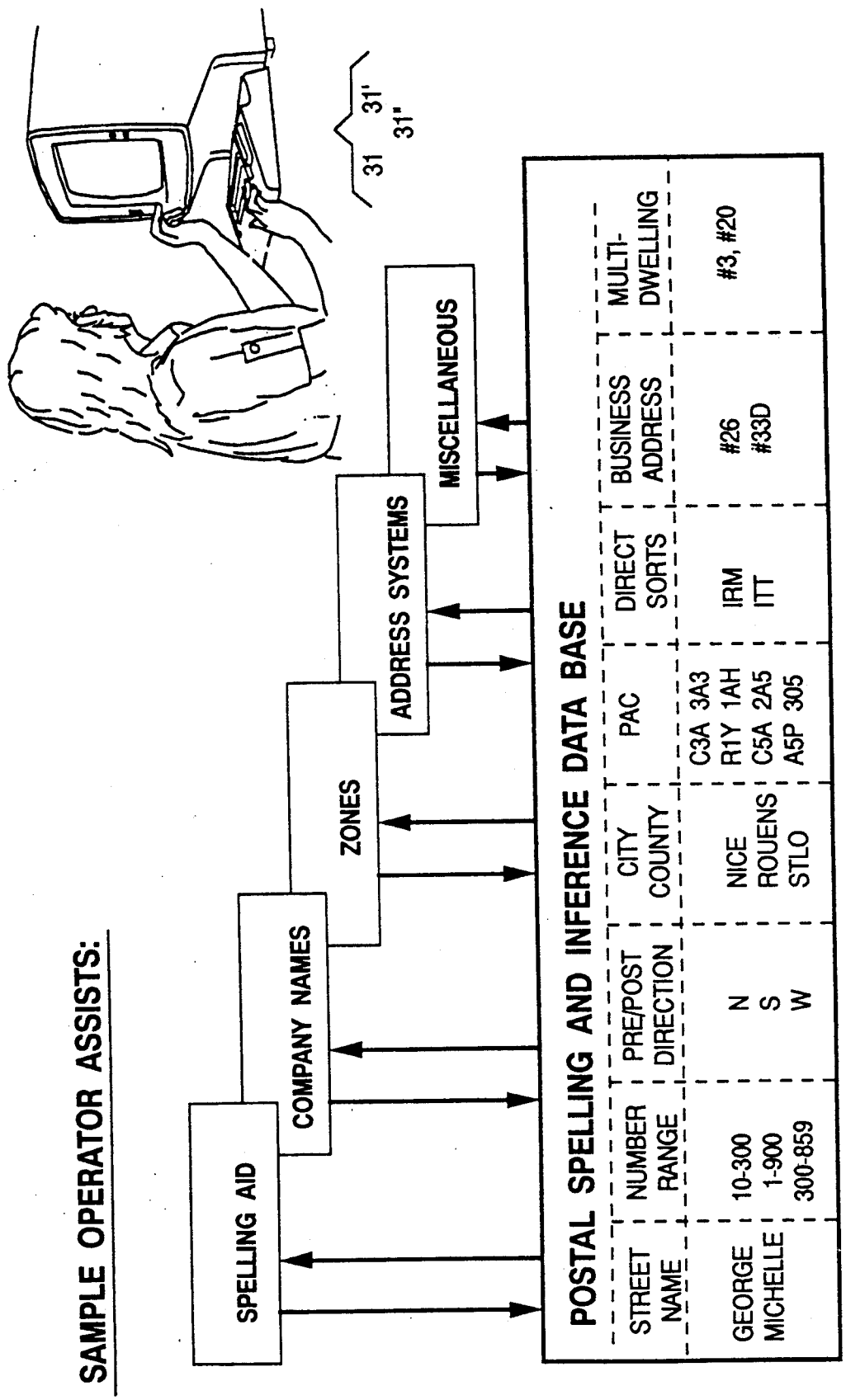
FIG. 7 illustrates sample operator assists at a workstation, in accordance with the invention.
Figure 8:
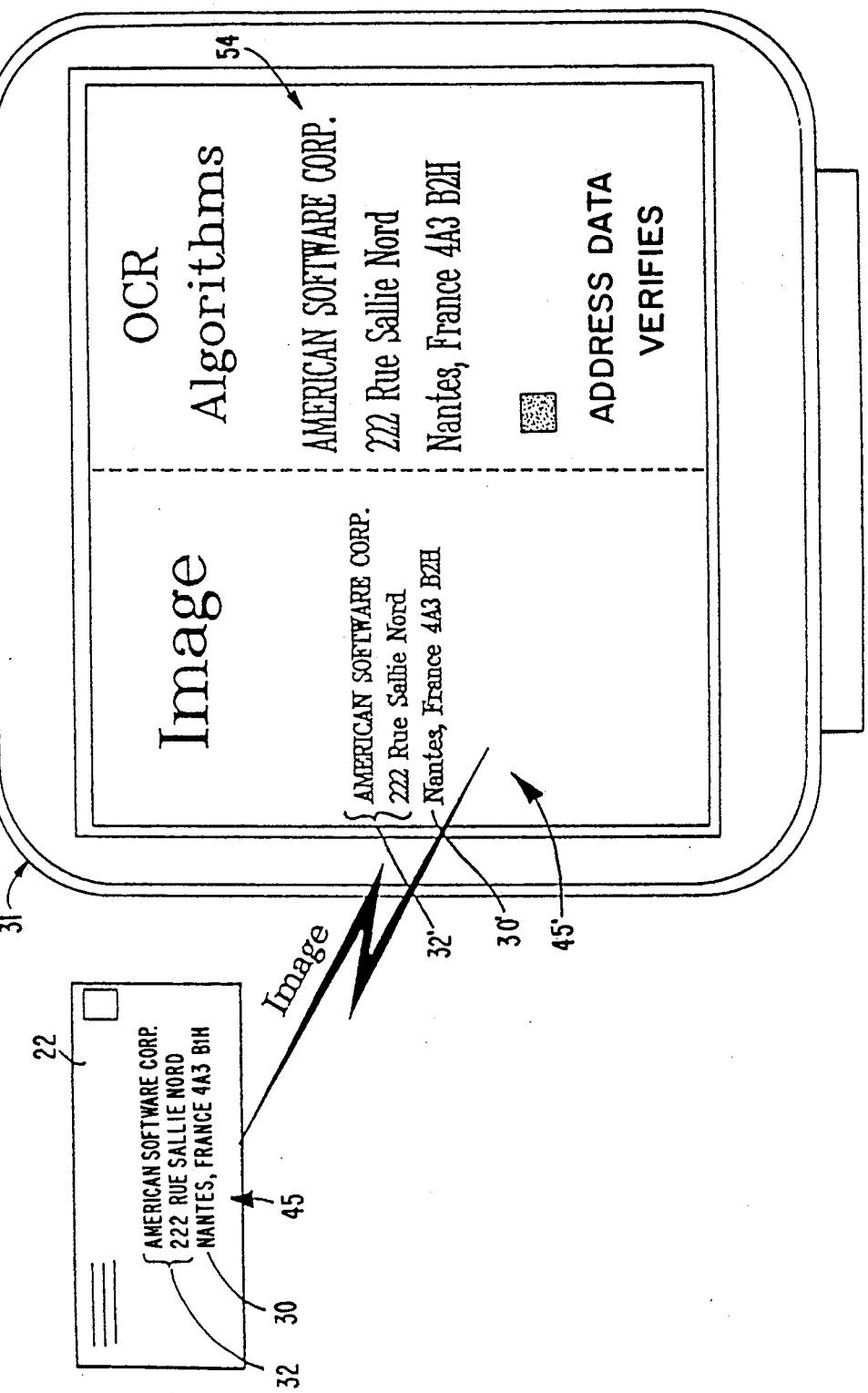
FIG. 8 illustrates the normal case where the address block is processed off-line and all fields are successfully verified with no operator intervention.

Since the resolved address data block 40 can be transmitted over the communications link 29 at an earlier time than the expected time of arrival of the physical mail piece 22 at the receiving location 28, the information contained in the resolved address data block 40 can be used at the receiving location 28 to allocate resources at the destination location. Resource allocation information can be computed by the CPU 23' and output at a display and/or printer or at the workstations 31'. Where an address data block is misread or cannot be read by the OCR 20 at the sending location 10, a sequence of operator intervention steps and/or algorithmic interpretation steps can be carried out. As is shown in FIG. 8, the scanned image 45' of the address block can be displayed at an operator workstation 31 at either the sending location 10, the off-line or remote processing location 14, or at the receiving location 28, and the alphanumeric character string 54 resulting from the OCR recognition operation can also be displayed. FIG. 7 illustrates examples of operator assists by the workstation 31, 31' or 31" to enable spelling aid and validation of company names, zones, address systems, and miscellaneous information to assist the operator in making a decision about how to correct an OCR misread alphanumeric string 54. FIG. 9 illustrates the case where the address block 45 on the mail piece 22 is not properly aligned and the operator can use the mouse 46 to designate the portion of the image 45' representing the destination address. The workstation 31 can then automatically compute the correct alphanumeric character string 54. In FIG. 10, a third case is shown where the address block 45 has a poor image 45' which is misread by the OCR as the alphanumeric string 54. The workstation 31, 31' or 31" can perform a data base lookup of street names, for example, whose spellings most closely approximate the alphanumeric character string 54. A first alternative 56A and a second alternative 56B are then presented to the operator who can then select the appropriate alternative spelling, which is then inserted as the selected street name into the portion 44 of the address data block 40.

Figure 11A:
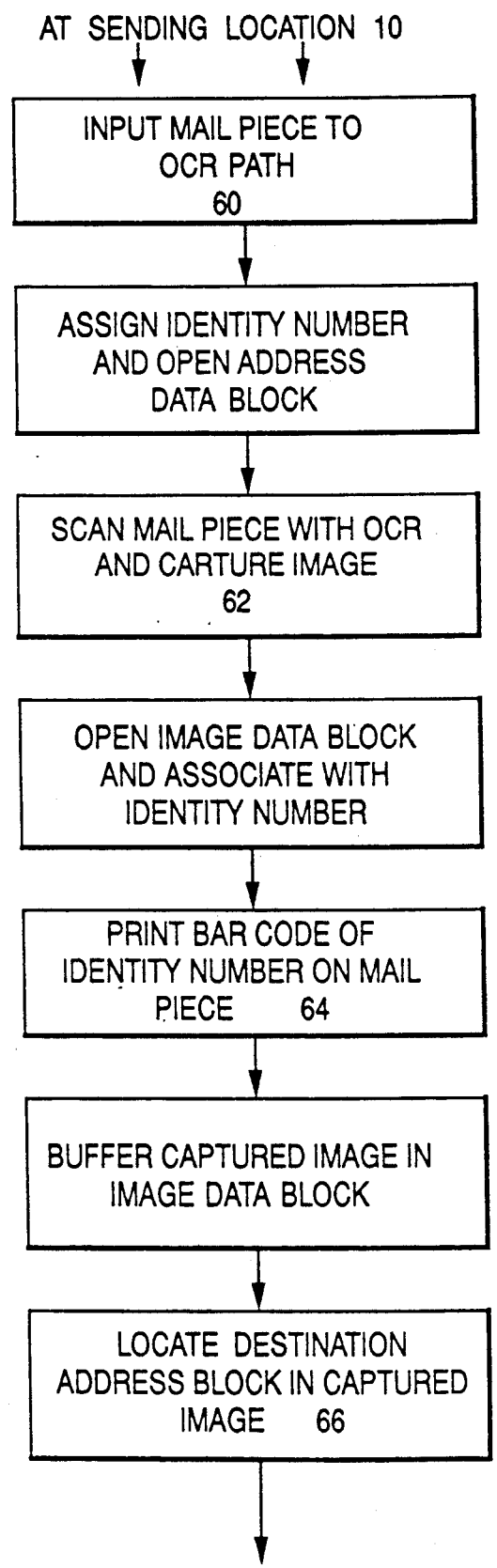
FIG. 11, consisting of FIGS. 11A, 11B and 11C, is a process flow diagram illustrating the method of the invention as carried out at the sending location.
Figure 11:
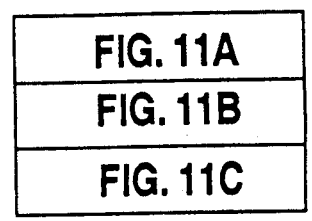
Figure 11B:
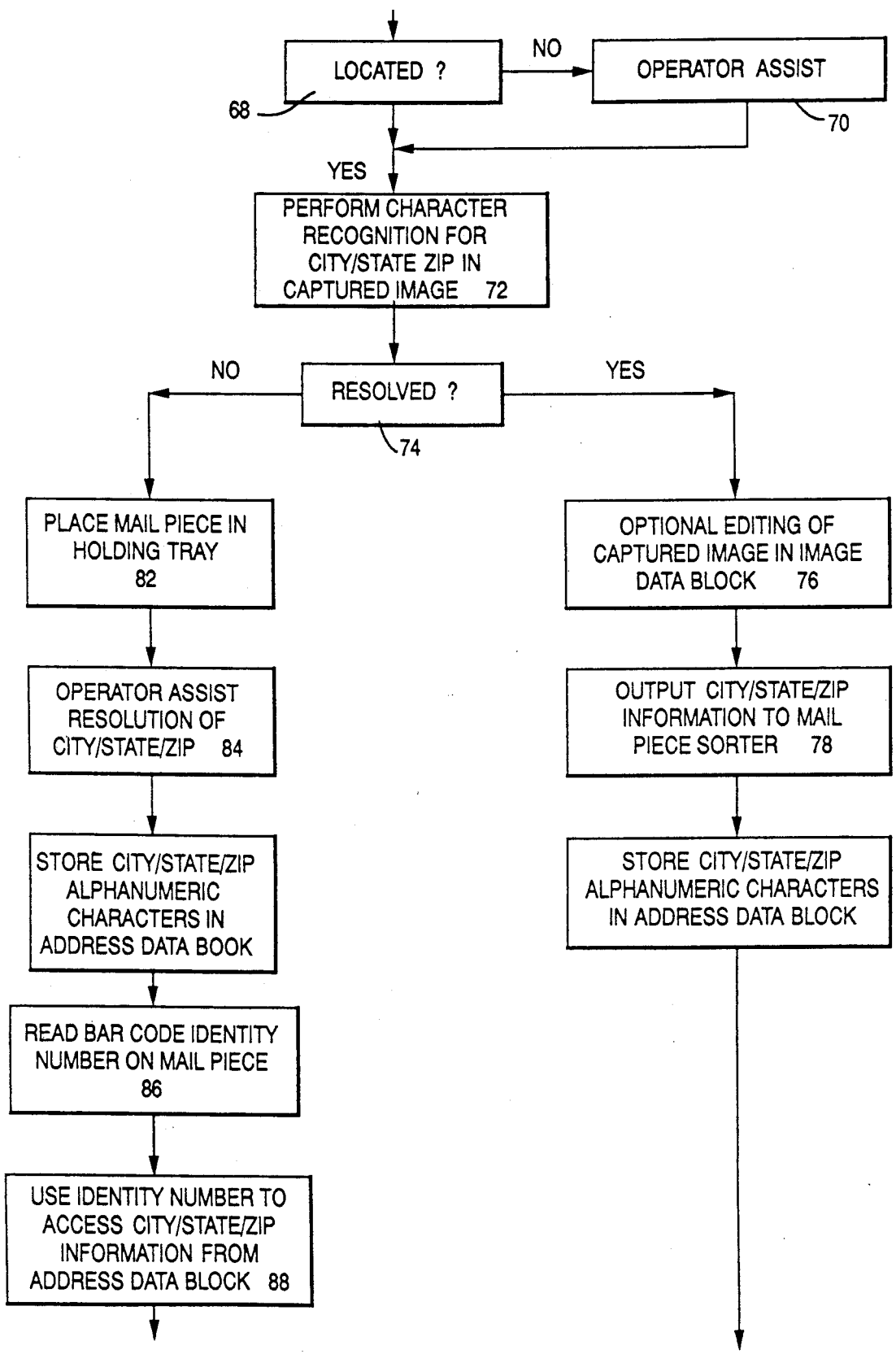

FIG. 11, consisting of FIGS. 11A, 11B and 11C, is a sequence of method steps performed at the sending location 10 to process an incoming mail piece in the system shown in FIG. 2. At step 60, a mail piece is input to the conveyor 12 and an ID number is assigned to the mail piece and an address data block is created. Then in step 62, the mail piece is scanned by the OCR 20 and the image 45' is captured and stored in the image data block 17 of the memory 19. Then in step 64, the bar code printer 21 prints the ID number 24' on the mail piece 22. The image 45' of the mail piece is buffered in the memory 19 and optionally in the mass store 25. The CPU 23 then in step 66, attempts to locate the address block in the captured image 45'. In step 68, if the address block is located, then the process passes to step 72. However, if the address block has not been located, then at step 70, an operator at one of the workstations 31 will assist in locating the address block, as was shown for case 2 in FIG. 9. In step 72, an attempt is made to resolve the image portion 30' for the city/state and zip code. In step 74, if the image 30' is resolved, then the process passes to step 76 where optional editing of the image data can be performed and then the resolved alphanumeric string for the city/state and zip are buffered in portion 42 of the address data block 40 and are also output to the mail sorting machine 33 to sort the mail piece on the conveyor 12. At step 74 if the city/state/zip code image 30' is not resolved, then the process flows to step 82 where the mail piece 22 is stored in the temporary holding tray 18. Then, one of the operators at the workstations 31 will perform an operator assist to resolve the city/state/zip code information in step 84. This information is then stored in the portion 42 of the address data block 40. In step 86, the mail piece exits the holding tray 18 and the bar code reader reads the ID number for the mail piece and uses the ID number in step 88 as the address for accessing the city/state/zip information from portion 42 of the address data block 40 in the memory 19 and this information is then output in step 90 to the mail piece sorting machine 33 to sort the mail piece on the conveyor belt 12. Then in step 80, the sorted mail piece is transferred from the conveyor belt 12 to the transport 26 for physical transportation to the destination location 28. Then the process flows to step 92 where the mail piece electronic folder 16 is assembled as shown in FIG. 4, and this telecommunications message is then output by the communications adaptor 27 on the communications link 29 to either the off-line/remote processing system 14 or to the receiving location 28, where the image 32' of the addressee, street name and street number can be resolved into alphanumeric strings. Alternately, the resolution of the image 32' for the addressee, street name and street number can be performed at the sending location 10 by the CPU 23.

Figure 12B:
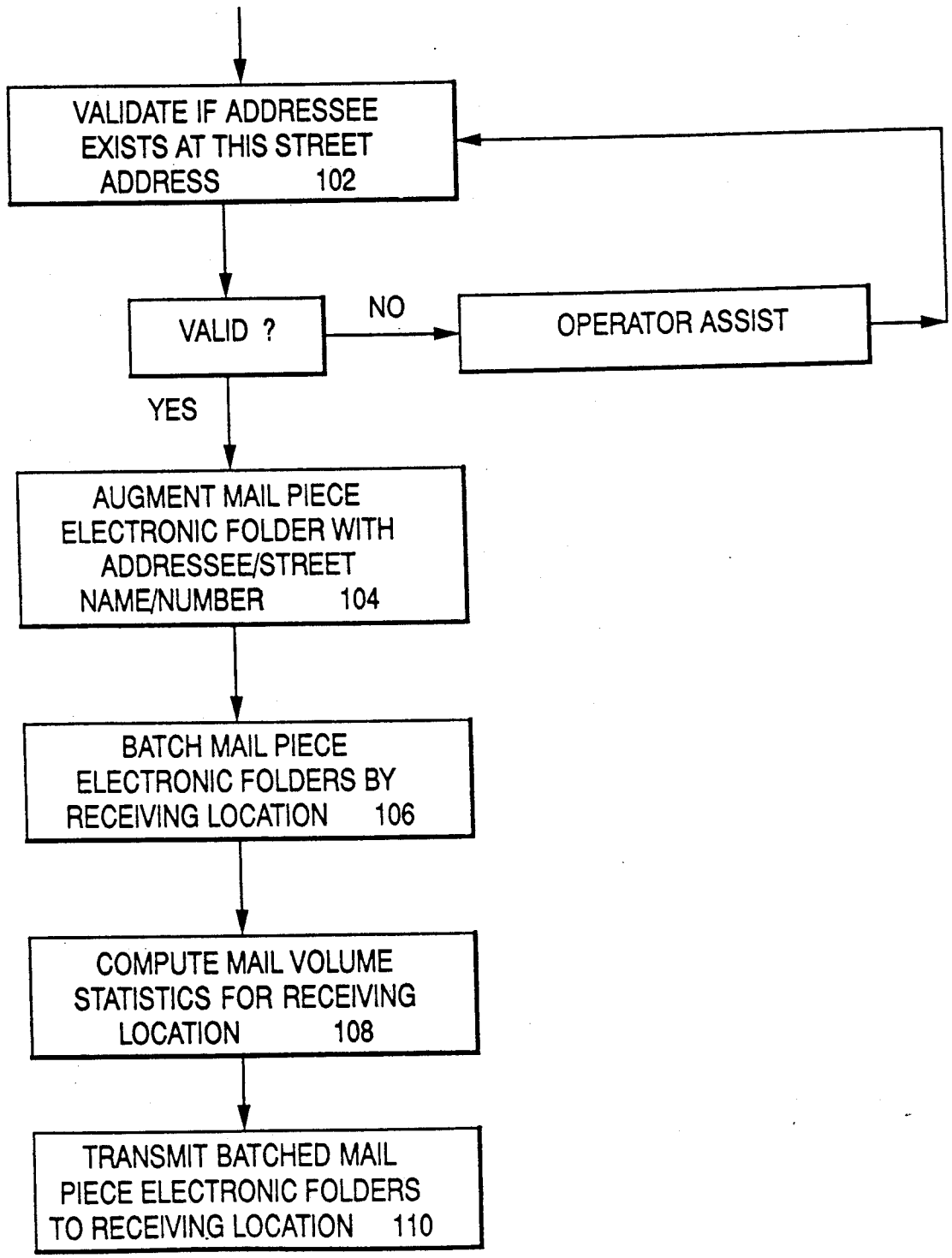
FIG. 12, consisting of FIGS. 12A and 12B, is a process flow diagram illustrating the method of the invention at the off-line or remote processing location.

For the example where the resolution of the image 32' of the addressee, street name and street number information is to be performed at the off-line or remote processing location 14, FIG. 12 illustrates the sequence of operational steps for performing that resolution. In FIG. 12, step 94 receives and stores the mail piece electronic folder 16. Then in step 96, a second pass of the stored image of 45' is performed for character recognition of the image 32' of the addressee, street name and street number information. In step 98, a validation test is performed to determine if the street address which is resolved in step 96 is a street address which exists in the city information which was resolved in step 72. This can be performed by a data base comparison, using a data base containing all of the valid street names for each of a plurality of cities. If the validation test is not passed, then an operator assist can be provided to interpret and correct either the resolved street address information or city information. Then in step 100, a validation test can be performed to determine if the street number range resolved in step 96 and the street match the zip code resolved in step 72. If the validation test is not passed, then an operator assist step can be performed. Then in step 102, a validation can be performed to determine if the addressee information resolved in step 96 corresponds to an addressee name which is shown to exist at the street address which was resolved in step 96. If the validation test is not passed, then an operator assist step can be performed. Then in step 104, the mail piece electronic folder 16 can have its portion 44 augmented with the additional resolved information for the addressee, street name and street number information which was resolved in step 96 and which was validated in steps 98, 100 and 102. Then in step 106, the mail piece electronic folders 16 can be sorted and batched by the identity of the receiving location 28. Then in step 108, statistics can be compiled as to the volume of mail which is directed to each respective receiving location 28. This information can be used at each respective receiving location 28 to allocate resources necessary to handle the physical mail which is now en route on the transport 26. Then in step 110, the sorted and batched mail piece electronic folder 16 can be transmitted over the communications link 29 to the respective receiving locations 28.

Figure 14:
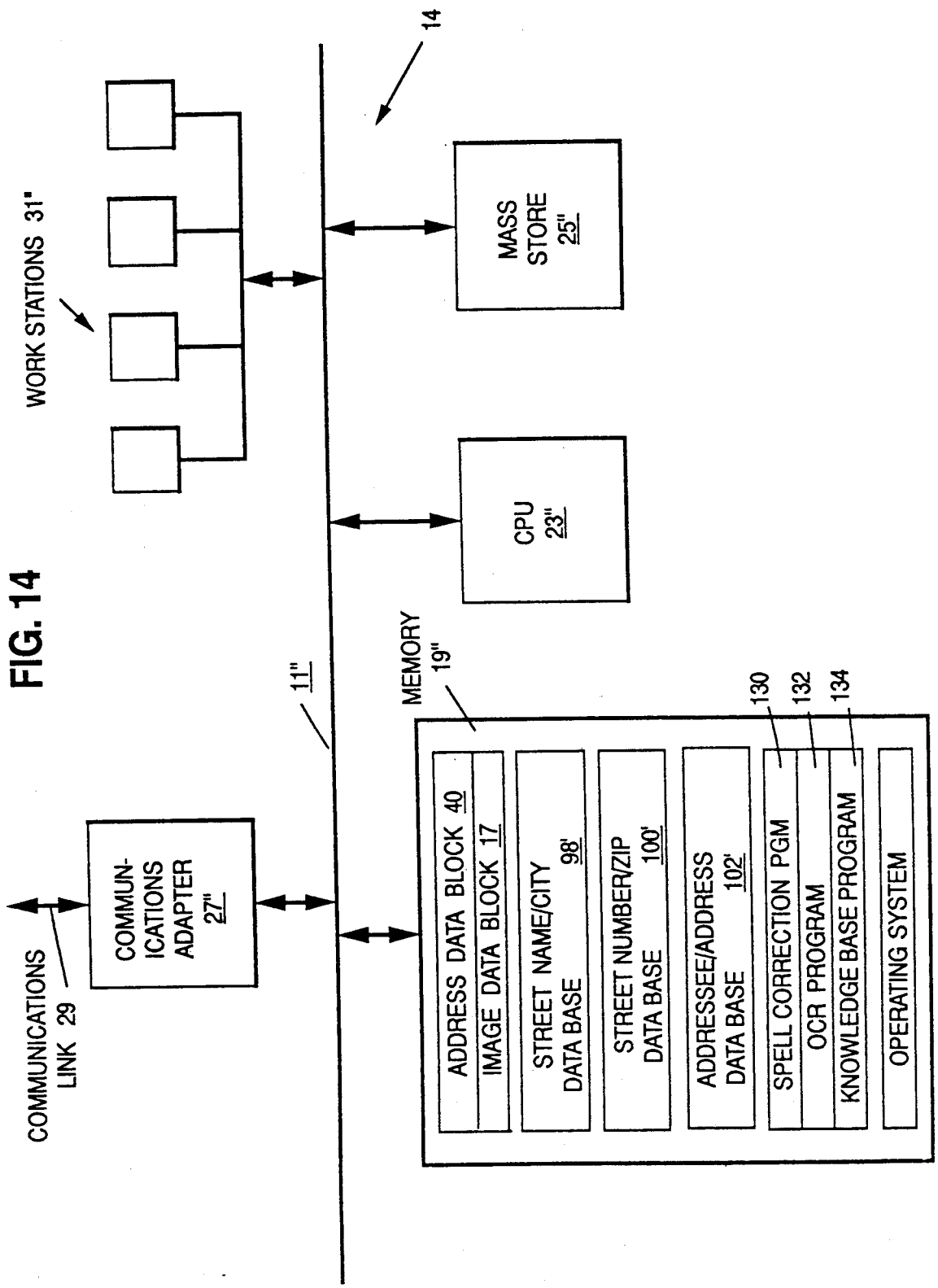
FIG. 14 is an architectural diagram of the off-line or remote processing system 14.

The data processing architecture for the off-line or remote processing system 14 is shown in more detail in FIG. 14. The system bus 11" interconnects the memory 19", the CPU 23", the mass store 25" and the workstations 31", to the communications adaptor 27" which is connected to the communications link 29 from the sending location 10. The mail piece electronic folder 16 in FIG. 4 is received over the communications link 29 by the communications adaptor 27" and the data therein is stored in the memory 19" in the address data block 40 and the image data block 17, addressable by the corresponding serial number 24'. If the addressee information and/or the street name and street number information has not yet been resolved at the sending location 10, then the off-line/remote processing system 14 will carry out the resolution of this information, to insert alphanumeric strings representing this information into the portion 44 of the address data block 40.

The OCR program 132 in memory 19", will analyze the image portion 32' of the captured image 45' stored in the image data block 17 and will produce an alphanumeric string representing the street name. Then, step 98 in the process flow diagram of FIG. 12 will perform a validation test to determine if this street name exists in the city whose name has been resolved and is currently stored in the portion 42 of the address data block 40. The knowledge base program 134 performs a check of the street name/city data base 98' which is shown in greater detail in FIG. 15. If the city name for example is "Springfield" in portion 42 of the address data block 40, and the OCR program 132 has output the alphanumeric string "Arbor Dr." for the street name, then the data base 98' is checked to validate that this street name actually occurs in the city of Springfield. If it occurs, then the process flow diagram of FIG. 12 passes to the next step. However, if there is no corresponding street name match, then an initial check is made to determine if there is a simple spelling error in the alphanumeric string output by the OCR. This is performed by the spell correction program 130 in the memory 19", which can be for example the spelling correction program described in U.S. Pat. No. 4,328,561 by Rosenbaum, et al. entitled "Alpha Content Match Prescan Method for Automatic Spelling Error Correction," which is assigned to the IBM Corporation and incorporated herein by reference. For example, if the spelling of the alphanumeric string output by the OCR program 132 for the street address is "Arbar," the spelling correction program 130 will be able to identify that there is a close match between the misspelled "Arbar" and the data base occurrence of the name "Arbor." The knowledge base program 134 can then present to the operator at the workstation 31", the misspelled alphanumeric character string output from the OCR program 132, and the suggested correct spelling for the street name output by the spell correction program 130, and the operator at the workstation 31" can indicate which spelling is to be selected for insertion in portion 44 of the address data block 40 in memory 19".

The process flow diagram of FIG. 12 continues to step 100 where a validation is performed on the number range of the street number which is output from the OCR program 132 in its attempt to resolve the street number portion of the image 32' of the captured image 45' stored in the image data block 17. This validation is performed by the knowledge base program 134, which makes use of the street number/zip data base 100' which is shown in greater detail in FIG. 15. If the zip code value resolved in portion 42 of the address data block 40 is "99110," and if the validation step 98 for the street name has resulted in a resolved street name of "Arbor Dr." which is now stored in portion 44 of the address data block 40, and if the OCR program 132 has output a suggested street number of "500," then the knowledge base program 134 accesses the street number/zip data base 100' to determine if the string of "500" suggested by the OCR program is a valid number within the address range for the zip code value "99110." As can be seen by reference to the street number/zip data base 100' in FIG. 15, the OCR suggested value of "500" is within the range for the zip code value "99110," and therefore the suggested string "500" output by the OCR program 132 is stored in portion 44 of the address data block 40. If the validation test for the street number had not been passed, then the OCR suggested value of "500" would have been presented to the operator at the workstation 31" along with the captured image 45', so that the operator could key in a correct street number value which would then be stored in portion 44 of the address data block 40.

In a similar manner, the process flow diagram of FIG. 12 will pass to step 102 where a validation is performed as to whether the addressee name string output by the OCR program 132 in its analysis of the image data block 17, gives the name of an addressee which does exist at the street address name and street address number which have been resolved and are now stored as alphanumeric strings in the address data block 40. The knowledge base program 134 will make use of the addressee/address data base 102' in the memory 19" to make this determination in a manner similar to the analysis performed for the validation step 98. Additional information fields in the captured image 45' can also be analyzed by the OCR program 132, such as building floor, corporate name, and other address information, as appropriate.

After all of the fields in the portion 32' of the captured image 45' in the image data block 17 which are capable of resolution, have been resolved into alphanumeric character strings and have been stored in the address data block 40, the mail piece electronic folder 16 is completed with the additional resolved alphanumeric data which is added to portion 44 in FIG. 4, and then the mail piece electronic folder 16 is transmitted by the communications adaptor 27" over the communications link 29 to the receiving location 28. If all of the captured image 45' has been resolved, then it is optional whether the image data block 17 information needs to be transmitted on to the receiving location 28.

Figure 13:
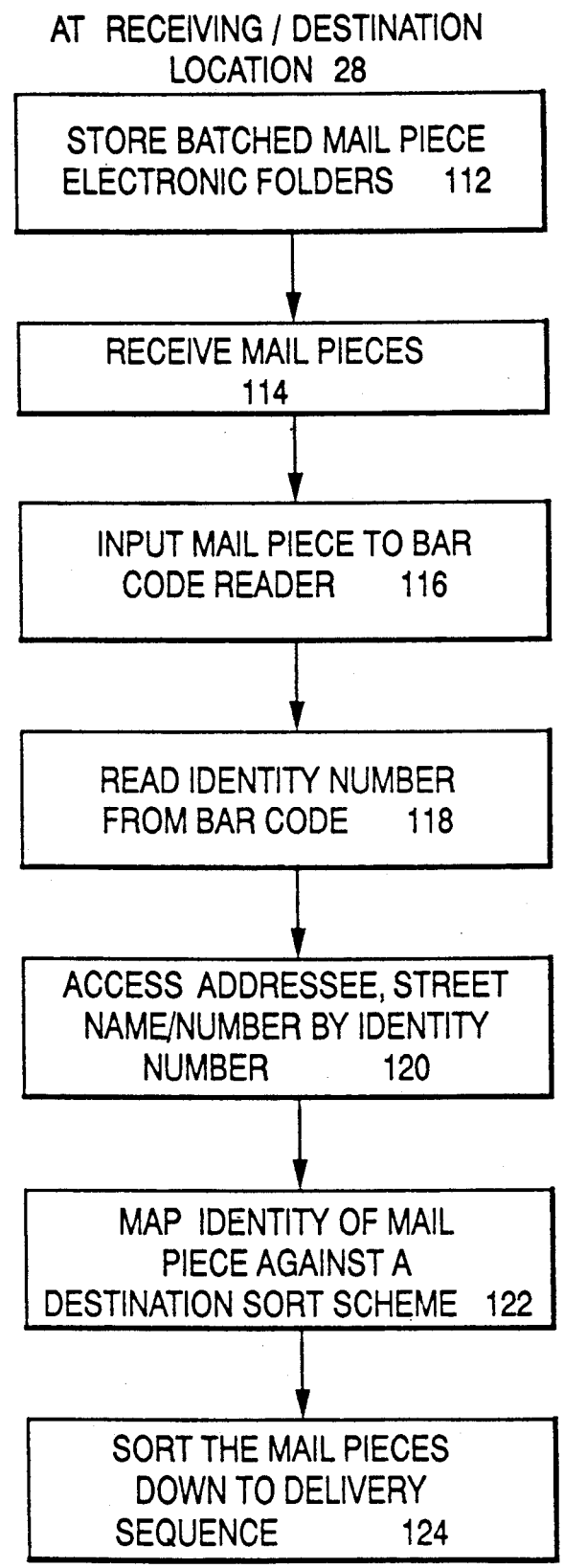
FIG. 13 is a process flow diagram illustrating the method of the invention at the receiving location.

FIG. 13 shows a flow diagram of the sequence of operational steps to perform the invention at the receiving location 28. In step 112, the mail piece electronic folder 16 is received over the communications link 29 by the communications adaptor 27' in FIG. 5. In step 114, the transport 26 delivers the physical mail pieces 22 which are input to the conveyor belt 12'. In step 116, the mail piece 22 has its bar code 24 read by the bar code reader 37'. In step 118, the bar code ID is applied in step 120 to access the addressee, street name and street number information from the address data block 40 which is now stored in the memory 19', after having been received by the communications adaptor 27'. This addressee, street name and street number information is then output by the CPU 23' to the sort machine 33' to sort the mail piece 22 on the conveyor 12' so that sortation can be performed down to the delivery sequence. The sorting steps in step 122 and 124 are resolved in the sorting of the mail piece to an appropriate local mail route, in a street name order and address number order and in a building floor order, if appropriate.

A sortation program 140 and a resource allocation program 142 are present in the memory 19' at the receiving location 28 in FIG. 5, to carry out the sortation of the mail pieces down to the delivery sequence and to carry out the provision of resource allocation information to enable local postal management to have advance warning of a need for additional resources to handle the physical mail pieces to be delivered to the receiving location.

Although a specific embodiment of the invention has been disclosed, it will be understood by those having skill in the art that changes can be made to that specific embodiment without departing from the spirit and the scope of the invention.

What is claimed is:

1. A method for deferred processing of a mail piece having a destination address block including a first routing portion designating at least a destination postal region location and a second routing portion designating at least an addressee, comprising the steps of:

capturing an image of said destination address block at a sending marking said mail piece with an indicium representing its identity location;

sorting said mail piece at said sending location in response to said first signal for transport to said destination location;

transporting said mail piece to said destination postal region location;

analyzing said image during a second time interval later than said sorting step, to generate a second signal representing said addressee;

transmitting said second signal after said second time interval to said destination postal region location;

receiving said mail piece at said destination postal region location, identifying said mail piece by reading said indicium, and sorting said mail piece in response to 2. The method of claim 1, which further comprises the step of:

computing postal resource allocation information for said destination location in response to said first signal.

3. The method of claim 1, which further comprises the step of:

determining, during said step of analyzing to generate said second signal, whether said addressee, as represented by said second signal, is located at said destination location;

presenting said image of said destination address block to an operator for interpretation of addressee information therein, if said addressee, as represented by said second signal, is not located at said destination location.

4. A method for deferred processing of a mail piece having a destination address block including a first routing portion designating at least a destination state and a second routing portion designating at least an addressee, comprising the steps of:

capturing an image of said destination address block at a sending location;

marking said mail piece with an indicium representing its identity;

analyzing said image of said destination address block at said sending location to generate a first signal representing said destination state;

sorting said mail piece at said sending location in response to said first signal for transport to said destination state;

transporting said mail piece to said destination state;

transmitting said image of said destination address block to a second location and analyzing said image thereat to generate a second signal representing said addressee;

transmitting said second signal and said identity of said mail piece from said second location to said destination state;

receiving said mail piece at said destination state;

identifying said mail piece at said destination state by reading said indicium thereon and sorting said mail piece in response to said second signal for delivery to said addressee.

5. The method of claim 4, which further comprises the step of:

computing postal resource allocation information for said destination state in response to said first signal.

6. The method of claim 4, which further comprises the step of:

determining, during said analyzing at said second location, whether said addressee, as represented by said second signal, is located at said destination state;

representing said image of said destination address block to an operator for interpretation of addressee information therein, if said addressee, as represented by said second signal, is not located at said destination state.

7. A method for deferred processing of a mail piece having a destination address block including a first routing portion designating at least a destination city and a second routing portion designating at least an addressee, comprising the steps of:

capturing an image of said destination address block at a sending location;

marking said mail piece with an indicium representing its identity;

analyzing said image of said destination address block at said sending location to generate a first signal representing said destination city;

sorting said mail piece at said sending location in response to said first signal for transport to said destination city;

transporting said mail piece to said destination city;

transmitting said image of said destination address block to a second location and analyzing said image thereat to generate a second signal representing said addressee;

transmitting said second signal and said identity of said mail piece from said second location to said destination city;

receiving said mail piece at said destination city;

identifying said mail piece at said destination city by reading said indicium thereon and sorting said mail piece in response to said second signal for delivery to said addressee.

8. The method of claim 7, which further comprises the step of:

computing postal resource allocation information for said destination city in response to said first signal.

9. The method of claim 7, which further comprises the step of:

determining, during said analyzing at said second location, whether said addressee, as represented by said second signal, is located at said destination city;

presenting said image of said destination address block to an operator for interpretation of addressee information therein, if said addressee, as represented by said second signal, is not located at said destination city.

10. A method for deferred processing of a mail piece having a destination address block including a first routing portion designating at least a destination country and a second routing portion designating at least an addressee, comprising the steps of:

capturing an image of said destination address block at a sending location;

marking said mail piece with an indicium representing its identity;

analyzing said image of said destination address block at said sending location to generate a first signal representing said destination country;

sorting said mail piece at said sending location in response to said first signal for transport to said destination country;

transporting said mail piece to said destination country;

transmitting said image of said destination address block to a second location and analyzing said image thereat to generate a second signal representing said addressee;

transmitting said second signal and said identity of said mail piece from said second location to said destination country;

receiving said mail piece at said destination country;

identifying said mail piece at said destination country by reading said indicium thereon and sorting said mail piece in response to said second signal for delivery to said addressee.

11. The method of claim 10, which further comprises the step of:

computing postal resource allocation information for said destination country in response to said first signal.

12. The method of claim 10, which further comprises the step of:

determining, during said analyzing at said second location, whether said addressee, as represented by said second signal, is located at said destination country;

presenting said image of said destination address block to an operator for interpretation of addressee information therein, if said addressee, as represented by said second signal, is not located at said destination country.

13. A system for deferred processing of a mail piece having a destination address block including a first routing portion designating at least a destination location and a second routing portion designating at least an addressee, comprising:

means for capturing an image of said destination address block at a sending location;

means for marking said mail piece with an indicium representing its identity;

representing said destination location;

means coupled to said analyzing means, for sorting said mail piece at said sending location in response to said first signal for transport to said destination location;

means coupled to said capturing means, for transmitting said image of said destination address block to a second location;

means coupled to said transmitting means, for analyzing said image at said second location to generate a second signal representing said addressee;

means coupled to said analyzing means at said second location, for transmitting said second signal to said destination location;

means for transporting said mail piece from said sending location to said destination location;

means coupled to said transmitting means at said second location, for receiving said mail piece at said destination location identifying said mail piece by reading said indicium, and sorting said mail piece in response to said second signal for delivery to said addressee.

14. The system of claim 13, which further comprises:

means coupled to the first said analyzing means, for computing postal resource allocation information for said destination location in response to said first signal.

15. The system of claim 13, which further comprises:

means in said analyzing means at said second location, for determining whether said addressee, as represented by said second signal, is located at said destination location;

means at said second location, for presenting said image of said destination address block to an operator for interpretation of addressee information therein, if said addressee, as represented by said second signal, is not located at said destination location.

16. A method for deferred processing of a mail piece having a destination address block including a first routing portion designating at least a postal region destination location and a second routing portion designating at least an addressee, comprising the steps of:

capturing an image of said destination address block at a sending location;

marking said mail piece with an indicium representing its identity;

analyzing said image of said destination address block during a first time interval to generate a first signal representing said destination postal region location;

analyzing said image during a second time interval later than said first time interval, to generate a second signal representing said addressee;

sorting said mail piece at said sending location in response to said first signal for transport to said destination location;

transporting said mail piece to said destination postal region location;

transmitting said second signal after said second time interval to said destination postal region location;

receiving said mail piece at said destination postal region location identifying said mail piece by reading said indicium, and sorting said mail piece in response to said second signal for delivery to said addressee.

* * * * *